United States Patent [19]
Colvard

[11] Patent Number: 5,872,629
[45] Date of Patent: Feb. 16, 1999

[54] ANALYTICAL DEPTH MONITOR UTILIZING DIFFERENTIAL INTERFEROMETRIC ANALYSIS

[75] Inventor: Carl Colvard, Palo Alto, Calif.

[73] Assignee: Charles Evans & Associates, Redwood City, Calif.

[21] Appl. No.: 880,942

[22] Filed: Jun. 23, 1997

[51] Int. Cl.$^6$ ..................................................... G01B 9/02
[52] U.S. Cl. ......................... 356/349; 356/351; 356/360
[58] Field of Search .................................. 356/345, 349, 356/351, 359, 360

[56] References Cited

U.S. PATENT DOCUMENTS

| | | | |
|---|---|---|---|
| 3,849,003 | 11/1974 | Velfel ......................................... | 356/351 |
| 4,298,283 | 11/1981 | Makosch et al. ......................... | 356/351 |
| 4,719,120 | 1/1988 | Green et al. . | |
| 5,017,012 | 5/1991 | Merritt, Jr. et al. . | |
| 5,469,259 | 11/1995 | Golby et al. ............................. | 356/351 |

FOREIGN PATENT DOCUMENTS 1138225  11/1966  United Kingdom .

*Primary Examiner*—Robert Kim
*Attorney, Agent, or Firm*—Jeffrey P. Aiello; Aiello Patent Prosecution

[57] ABSTRACT

A device for measuring changes in the relative height or depth of microscopic surface features of a sample that allows crater depth measurements to be made while depth profile analyses are proceeding is provided. The depth monitor comprises a dual beam optical interferometer, that is preferably adapted for use with analytical instruments, such as SIMS, XPS, ESCA, and AES instruments. The monitor provides substantially accurate depth measurements and a continuous readout for monitoring the sputter rate of an ion beam etch in real time, for correcting for any variations in the sputter rate as craters are formed in the sample. The invention also allows integration of real time depth measurements into data collecting software to eliminate the assumption that the material comprising the sample has the same sputter rate as a reference material. The in situ depth measurements provided by the invention are more accurate than prior art crater depth analysis and reduce processing times. The dual beam design of the monitor assures that fluctuations in the total path length of the beams, do not affect depth measurement of craters in the sample. Vibrations do not affect depth measurements, since the monitor uses common mode rejection, with the beams sharing a common optical path and any increase or decrease in total path length is common to both beams. Thus, changes in path length due to vibrations does not affect any length differentiation between the two beams and depth measurements are not affected.

26 Claims, 2 Drawing Sheets

ANALYTICAL DEPTH MONITOR UTILIZING DIFFERENTIAL INTERFEROMETRIC ANALYSIS

BACKGROUND OF THE INVENTION

1. Field of the Invention

The present invention relates generally to devices for measuring the profile of the surface of a sample such as a semiconductor wafer, and more particularly, to a device for measuring changes in the relative height or depth of microscopic surface features of a sample, such as a semiconductor wafer, that allows crater depth measurements to be made while depth profile analyses are proceeding.

2. Description of Related Art

Measurements of elemental surface composition are critical in the manufacture of electronic and optoelectronic devices. These electronic devices include known semiconductor integrated circuit devices, such as data processing and memory devices. Optoelectronic devices, such as semiconductor lasers, comprise a fast growing area of modern technology and is key in many advances in the communications and information industries. Constant increases in the density of the devices situated on a semiconductor chip and reductions in device dimensions severely strain current production and characterization technologies.

During manufacture of these devices, constraints such as multiple surface layers, controlled dopants, engineered composition gradients, and unwanted impurities combine to determine the operation and yield of the manufactured device. Secondary ion mass spectrometry (SIMS), X-ray photoelectron spectrometry (XPS), and Auger electron spectrometry (AES) are essential methods used for surface analysis of trace elements and major components in these materials. Due to their sensitivity to the near-surface region of a material, these techniques allow measurement of material properties as a function of depth beneath the surface, an important procedure known as depth profiling.

In typical depth profiling, continuous or periodic ion beam sputtering forms a crater of microscopic dimensions in the surface of a sample, thus removing the surface material to expose progressively deeper material for further analysis. After the measurement is completed, samples are removed from the analytical instrument and sputtered crater depths are measured using a stylus profilometer or optical profilometer. Average known sputter rates are used to convert signal intensity versus the time that a measurement signal was received from the sample, to obtain data for comparing the composition of the material and the depth of the crater formed by the ion beam. Because different materials sputter at different rates, analysts use relative sputter rates measured in separate reference materials to adjust the average sputter rates calculated from crater depths. A disadvantage of these known methods is that shrinking device geometries, use of inhomogeneous materials, and increasing demands for ever tighter controls on dopant placement are maximizing the capabilities of these procedures.

In fabrication of high-speed electronic and optoelectronic devices, tight control of layer thickness, layer composition, and the precise positioning of dopant impurities relative to layer boundaries is critical. A disadvantage of the prior art, which uses external profilometers, for example to quantify the selenium (Se) and oxygen (O) concentrations in silicon containing multiple doped layers, is that it is necessary to make certain assumptions to apply sputter yield corrections in every layer. Thus, accurate depth measurements require pre-knowledge of the relative sputter rate for each layer of the sample. Calibration of the depth scale is based on a final crater depth measurement, and may not be sufficiently accurate for determining the time at which intermediate depths were reached.

A commercially available surface profiler sold under the trademark "MP2000", manufactured by Chapman Instruments, Inc., Rochester N.Y., comprises a stand-alone unit configured as a differential scanning interferometer that can be used for measuring crater depths after analysis of the sample is completed. The surface profiler incorporates a three-point phase shifting signal processing scheme for providing the device with a step height resolution of approximately 10 nm. However, a disadvantage of the disclosed surface profiler is that it cannot measure samples mounted inside of the vacuum chamber of a typical SIMS, XPS, or AES instrument. The sample must be removed and situated near the profilometer for measuring the surface of the sample. Another disadvantage of the disclosed surface profiler, and common to profilometers in the prior art, is that it does not provide real-time depth measurements of craters in the surface of the sample, as the craters are being formed.

Other known depth measuring devices include simple reflection monitors, which measure fringes in a reflected beam, and ellipsometers, which use polarizers to determine small phase shifts in the reflected light, each of which are used to measure film thicknesses. A disadvantage of each of these devices is that they are dependent on multiple film surfaces and are not suited for determining etch depths in a single surface.

Commercially available Michelson-type interferometers are used for position encoding on translation stages and for velocity measurements. These devices are used for measuring translations of the sample relative to a reference sample. However, a disadvantage of these devices is that they measure translations of the sample as a whole, and thus any motion of the sample relative to the external reference sample, such as caused by vibration, prevents the device from generating differential measurements that indicate the topography of the surface of the sample.

U.S. Pat. No. 5,017,012, to Merritt, Jr., et al., assigned to Chapman Instruments, Inc., Rochester N.Y., discloses a previewing profiler that includes apparatus to scan the surface of an object and to provide a display relating to the smoothness of the surface at a microscopic level. The system provides a polarized, collimated laser beam through a Nomarski-type prism and focuses the resulting beams on the surface to be scanned. A user operable rotatable mirror may be inserted between the laser and Nomarski prism. The mirror is designed to leak a small percentage of the laser light.

Another source of noncollimated polarized light, provided through a condensing lens, is provided to the rotatable mirror to be directed along the same path through the Nomarski prism and to be focused at a point above the surface being scanned, thereby providing a substantially larger illuminated area on the surface. The reflected light from both the laser beam and additional noncollimated light is focused on a charge coupled device (CCD) array and then displayed on a display. This permits the user to view the area to be profiled, including the profile line, prior to operating the profiler.

U.S. Pat. No. 4,719,120, to Green et al., is directed to a method for detection of oxygen in thin films. The method includes determining the presence, during deposition of a first thin film layer, of a substance which escapes when the layer is cooled and transferred from its deposition environment for analysis to determine the presence of the substance. The layer is first covered with a second layer of a material that captures the escaping substance. This second layer is then covered with a cap layer of a substance which seals the second layer against contamination, as from the atmosphere during transfer. The layered structure, with the escaped substance retained in the second layer, is then analyzed, as by sputter depth profiling and Auger electron spectroscopy, to determine the presence in the second layer of the escaped substance and thus determine the presence of this substance during deposition of the first layer.

Presently, there are a number of SIMS, XPS, and AES analytical instruments for surface analysis of samples and for determining the major components of the materials comprising the samples. However none of these known analytical instruments possess the capability of measuring crater depths. This may be due to the difficulty of performing crater depth measurements distally, inside an analytical vacuum chamber, with limited access to the sample and while the sample is vibrating, the analytical instrument is vibrating, or potentially both.

Thus, there exists a need for a device for measuring the depth of craters in the surface of a sample such as a semiconductor wafer and while depth profile analyses of the sample are proceeding.

OBJECTS OF THE INVENTION

It is therefore an object of the present invention to provide a device for measuring changes in the relative height or depth of microscopic surface features of a sample, such as ion beam etch craters in the surface of a semiconductor wafer;

It is another object of the present invention to provide a device for measuring changes in the relative height or depth of microscopic surface features of a sample that allows surface feature measurements to be made while depth profile analyses are proceeding;

It is a further object of the present invention to provide a device for measuring changes in the relative height or depth of microscopic surface features of a sample that is adaptable for use with analytical instruments;

It is still another object of the present invention to provide a device for measuring changes in the relative height or depth of microscopic surface features of a sample that is capable of accurately measuring microscopically small changes in the surface of the sample ranging from approximately 10 to 100 microns in lateral size;

It is yet a further object of the present invention to provide a device for measuring changes in the relative height or depth of microscopic surface features of a sample that provides accurate measurements in the presence of vibrations of an analytical instrument housing the sample, vibrations of the sample, and vibrations of the measuring device;

It is another object of the present invention to provide a device for measuring changes in the relative height or depth of microscopic surface features of a sample that provides real time sputter rate monitoring for correcting for any variations in sputter rate as craters are formed in the sample's surface;

It is yet another object of the present invention to provide a device for measuring changes in the relative height or depth of microscopic surface features of a sample that allows integration of real time depth measurements into data collecting software for correcting for any variations in sputter rate as craters are being formed in the sample's surface; and It is a still further object of the present invention to provide a device for measuring changes in the relative height or depth of microscopic surface features of a sample that eliminates the profilometry step of sample processing for reducing processing times.

SUMMARY OF THE INVENTION

These and other objects and advantages of the present invention are achieved by providing a device for measuring changes in the relative height or depth of microscopic surface features of a sample that allows crater depth measurements to be made while depth profile analyses are proceeding. In the preferred embodiment of the present invention, the device comprises an analytical depth monitor, configured as a dual beam optical interferometer, that is preferably adapted for use with analytical instruments, such as Secondary ion mass spectrometry (SIMS), X-ray photoelectron spectrometry (XPS), and Auger electron spectrometry (AES) type instruments.

The invented analytical depth monitor provides substantially accurate depth measurements and a continuous readout for monitoring the sputter rate of an ion beam etch in real time, for correcting for any variations in the sputter rate of the beam as etch craters are formed in the sample's surface. The present invention also allows integration of real time depth measurements into data collecting software, as analyses of the sample are proceeding, for correcting for any variations in sputter rate, including those caused by sputter beam intensity drift, for eliminating the assumption that the unknown material comprising the sample has the same sputter rate as a reference material.

The invented depth monitor is capable of providing depth resolutions down to approximately 0.05 nanometer (nm). The resolution provided by the invention enables the monitor to provide depth measurements for shallow craters. Particularly, the invented monitor is capable of measuring the depth of craters formed during shallow analyses to a depth of approximately 20 nm or less, that produce craters too shallow for prior art depth measurement techniques, such as stylus profilometry. The in situ depth measurements provided by the present invention increases analytical productivity of samples, by providing information for determining separate sputter rates for each layer of material of the sample and for generating real time process adjustments, and by eliminating the profilometry step of sample processing for reducing processing times, and thus sample turnaround times.

The present invention aids with fulfilling the growing requirement in the semiconductor industry to reduce sample turnaround times, by providing depth profile measurements in near real time process control. Additionally, the chance of mistaking one measured crater for another is effectively eliminated, since there is no longer the need for subsequent profilometry of the sample after crater formation using the invented depth monitor, a desirous feature for providing rapid throughput of processed samples.

Typically, a sample to be analyzed is vibrating in an analytical vacuum chamber, necessitating that the optics of the invention are maintained some distance from the sample. During analyses, the sample mounts and windows of the vacuum chamber often undergo some uncontrolled thermal drift. The dual beam design of the invented depth monitor allows for these problems by using unsputtered portions of the surface of the sample as the reference point, instead of a reference sample, to allow for common mode rejection of the path changes between a reference beam and a measurement beam generated by the present invention. The dual beam design of the invention assures that fluctuations in the total path length of the interferometer that are common to both beams, such as changes in total path length due to vibrations, do not affect depth measurement of craters in the surface of the sample.

Particularly, a beam generating device, such as a known low power laser source transmits a beam to a beam splitter that splits the transmitted beam into a measurement beam and a reference beam. The reference beam is preferably frequency shifted relative to the measurement beam for increasing the precision of surface measurements performed by the invention. An optical heterodyning approach is used to measure the path difference between the reference beam and measurement beam in the preferred embodiment of the present invention.

The co-propagating measurement and reference beams are then fed into a beam expander for diverging the beams to obtain a desired diameter thereof and collimated to prevent further divergence. The expanded and collimated beams then enter a deviation arrangement for deviating the reference beam a desired angle relative to the measurement beam or shifting the reference beam a desired lateral amount, for forming two separate spots as the two beams contact the sample's surface. Preferably, the reference beam is deviated a selected amount from the measurement beam to enable the reference beam to contact the surface of the sample, while the measurement beam extends into craters as they are formed.

The co-propagating measurement and reference beams exit the deviation arrangement and are transmitted into an analytical instrument, which may comprise a vacuum chamber, through a focusing lens. The focusing lens reduces the diameter of each of the beams, so that each beam contacts the sample at a separate, discrete location, with a distance ranging from approximately 100 to 300 microns between the beams, and have a spot size of approximately 10 microns in diameter as they contact the sample's surface. As the sample undergoes analysis, the reference beam extends along the unperturbed surface of the sample, while the measurement beam extends into craters in the sample's surface for providing information as to the depth of the crater. The resolution provided by the invention is capable of determining changes in the crater depth down to about 0.05 nm.

After the two beams contact the surface of the sample, the beams are reflected by the sample and transmitted out of the analytical instrument and into a signal receiving arrangement. The receiving arrangement receives the reflected measurement and reference beams, realigns the beams, and then transmits the co-propagating beams to a photodetection means for determining measured crater depth. The photodetection means compares the phase of the reflected co-propagating beams to the phase of a reference signal for detecting any difference therebetween. Any detected difference between the phase of the signals directly indicates a change in the sample's surface, such as the presence of a crater, and the depth of the crater. The photodetection means uses known measuring techniques for determining any difference in path length between the two beams.

Vibrations of the sample, or portions of the invented depth monitor, or both, do not affect depth measurements due to common mode rejection inherent in the dual-beam design of the invention, since the beams share a common optical path and any increase or decrease in total path length due to vibrations is common to both beams. Thus, changes in path length due to vibrations do not affect any length differentiation between the two beams, and thus depth measurements are not affected. The present invention is capable of detecting very small changes, approximately 0.05 nm or more, in the path length difference between the two signals for providing substantially accurate depth measurements of the craters formed in the sample's surface.

The detected phase differences between the reflected co-propagating beams and reference frequency are continuously readout in real time for monitoring the sputter rate of analysis of the sample, such as an ion beam etch, for example, for correcting for any variations in the sputter rate of the beam, as etch craters are being formed in the sample's surface. The detected phase differences may also be continuously transmitted to a computer running data collecting software for determining the presence of any craters in the sample's surface and the depth thereof, for monitoring sputter rate of the sample undergoing analyses. The computer continuously processes received depth measurement signals, for adjusting sputter rate of the sample, as the analyses of the sample are proceeding, to correct for any variations in sputter rate.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventor of carrying out the invention. Various modifications, however, will remain readily apparent to those skilled in the art, since the generic principles of the present invention have been defined herein.

Figure 1:
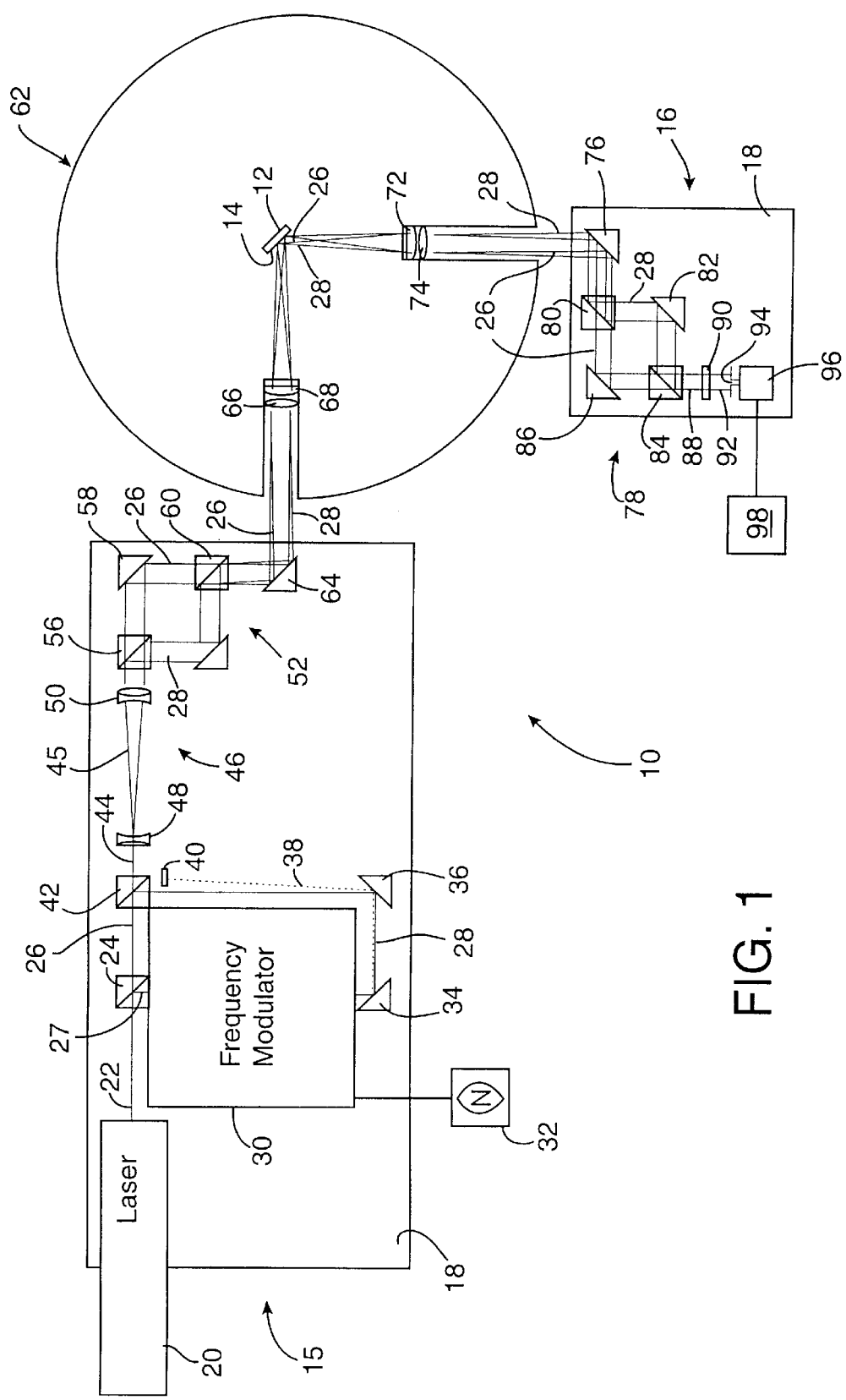
FIG. 1 is a schematic view showing a preferred embodiment of a device for measuring the depth of craters in the surface of a sample, and which allows crater depth measurements to be made while depth profile analyses are proceeding of the present invention.

Referring now to FIG. 1 of the drawings, there is shown generally at 10, a device for measuring changes in the relative height or depth of microscopic surface features of a sample 12 (shown in FIG. 2) that allows crater depth measurements to be made while depth profile analyses of the sample 12 are proceeding, constructed according to a preferred embodiment of the present invention. In the preferred embodiment, the device 10 comprises an analytical depth monitor, configured as a dual beam optical interferometer, that is preferably adapted for use with analytical instruments, such as Secondary ion mass spectrometry (SIMS), X-ray photoelectron spectrometry (XPS), and Auger electron spectrometry (AES) type instruments. One such SIMS instrument may comprise a PHI 6600 Quadrupole SIMS, manufactured by Physical Electronics, Inc., Eden Prairie, Minn.

The invented analytical depth monitor 10 provides substantially accurate depth measurements and a continuous readout for monitoring the sputter rate of an ion beam etch in real time, for correcting for any variations in the sputter rate of the ion beam (not shown) as etch craters 13 are formed in the sample's surface 14. The present invention also allows integration of real time depth measurements into data collecting software, as analyses of the sample 12 are proceeding, for correcting for any variations in sputter rate, including those caused by sputter beam intensity drift, for eliminating the assumption that the unknown material comprising the sample 12 has the same sputter rate as a reference material.

The invented depth monitor 10 is capable of providing depth resolutions down to approximately 0.05 nanometer (nm), thus the invented monitor 10 is well suited for providing depth measurements of shallow microscopic craters 13 in the sample 12. Particularly, the invented monitor 10 is capable of measuring the depth of craters formed during shallow analyses to a depth of approximately 20 nm or less, that produce craters too shallow for prior art depth measurement techniques, such as stylus profilometry. The in situ depth measurements provided by the present invention 10 increases analytical productivity of samples, by providing information for determining separate sputter rates for each layer of material of the sample 12 and by eliminating the profilometry step of sample processing for reducing processing times, and thus sample turnaround times.

The depth monitor of the present invention 10 aids with fulfilling the growing requirement in the semiconductor industry to reduce sample turnaround times, by providing depth profile measurements in near real time process control. Additionally, the chance of mistaking one measured crater for another measured crater is effectively eliminated, since there is no longer the need for subsequent profilometry of the sample after crater formation using the invented depth monitor 10, an advantageous feature for providing rapid throughput of processed samples.

Referring still to FIG. 1, in the preferred embodiment the invented depth monitor 10 comprises a source module, shown generally at 15, and a detector module, shown generally at 16. The componentry (to be discussed thoroughly hereafter), and particularly the optical components, of each of the modules 15, 16 are mounted using means to ensure maximum stability of the components. One means for mounting the components of the modules 15, 16 includes mounting the components on a rigid mounting structure 18, such as an optical table which may comprise a slab of a suitable material, such as an appropriate known metal alloy, a honeycomb configuration of a suitable material, granite, or other materials known in the art. Alternatively, the components of the modules 15, 16 may be connected serially by a rigid structure, such as one to four parallel rods at the edges of a parallelepiped. The rods are fabricated from a material having a low coefficient of thermal expansion, such as invar, quartz, or carbon fiber, for example.

The components of the modules 15, 16 are mounted on the mounting structure 18 to protect the components thereof from thermal, mechanical, and acoustic effects, such as vibrations. The components of the invented depth monitor 10 are situated on the mounting structure 18 in a manner that maximizes the compactness of the invention, provides alignment of the optical elements, and which allows rigid mounting of appropriate components and provides sufficient adjustment of necessary components.

The source module 15 includes a beam generating device 20, such as a known low power laser that may comprise any one of several known red or green lasers, such as a helium-neon or argon lasers, or blue lasers, such as a helium-cadmium laser, or a semiconductor diode laser. The laser 20 transmits a laser beam 22 to a first beam splitter 24 that preferably comprises a commercially available polarizing beam splitter. The polarizing beam splitter 24 is positioned at an angle, of approximately 45 degrees, to the transmitted beam 22 for passing a horizontal component 26 of the transmitted beam and for reflecting a vertical component 27 of the beam 22, such that the two resulting beams 26, 27 are orthogonally polarized. For clarity, the resulting horizontal component of the transmitted beam 22 is hereinafter referred to as the measurement beam 26.

After beam splitting, the vertical component 27 is preferably frequency shifted relative to the measurement beam 26 in order to use the known technique of optical heterodyning to improve interferometer precision. Any one of several known methods may be used to modulate, frequency shift, or phase shift the vertical component 27 relative to the measurement beam 26 for the purposes of improved measurement precision. Suitable methods include Doppler shifting the beams, using an electro-optic modulator to provide sinusoidal phase modulation of the optical path length of one of the beams, and optical heterodyning. In the present invention, frequency shifting means 30 comprises an acousto-optic Bragg cell that imparts a frequency shift to the first-order diffracted beam, hereinafter referred to as a reference beam 28. A reference signal power source 32 drives the Bragg cell 30 at a reference frequency ranging from approximately 40 MHz to 80 MHz. for shifting the reference beam 28 by the reference frequency.

The reference beam 28 is output from the frequency shifting means 30 and routed toward the measurement beam 26. A first mirror 34 receives the reference beam 28 from the shifting means 30 and reflects the beam 28 toward a second mirror 36 that directs the reference beam 28 toward the measurement beam 26. An undesired portion 38 of the beam 28, such as the zeroeth order thereof, is prevented from further transmission by terminating the portion 38 with an optical stop 40.

The second mirror 36 directs the reference beam 28 toward a second polarizing beam splitter 42, that recombines the reference beam 28 with the measurement beam 26. The second polarizing beam splitter 42 recombines the orthogonally polarized beams 26, 28, and causes the beams to co-propagate along an optical path 44. The co-propagating, orthogonally polarized beams 44 are then transmitted into a beam expander arrangement 46 comprising a diverging lens 48 and a collimating lens 50. The diverging lens 48 diverges the co-propagating beams 45 for increasing the diameter thereof, to reduce the diffraction limited size of focused spots 26A, 28B (shown in FIG. 2). The collimating lens 50 is provided to prevent further divergence of the beams 45, after the desired diameter of approximately 10 millimeters of each of the beams 45 is obtained.

Figure 2:
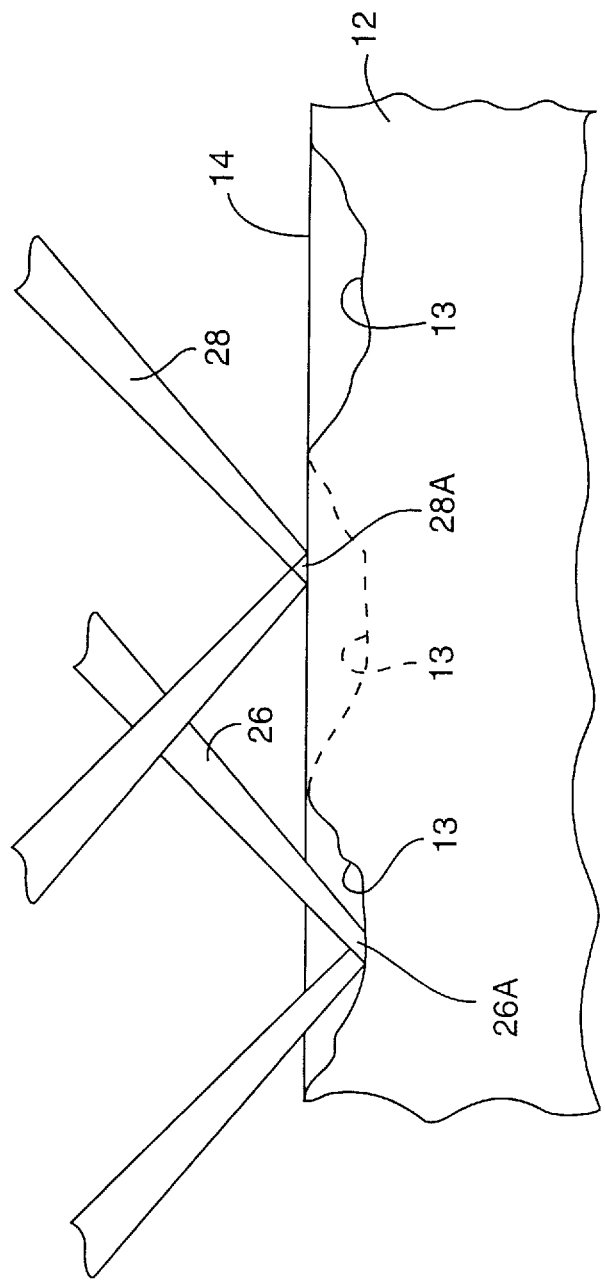
FIG. 2 is a greatly enlarged side elevational view showing measurement and reflection beams generated by the present invention contacting the surface of a sample.

Referring now to FIG. 1 and FIG. 2 of the drawings, a deviation arrangement, shown generally at 52, is provided to deviate the measurement beam 26 a desired angle relative to the reference beam 28, for forming and manipulating the two separate spots 26A, 28A when the beams 26, 28 strike the sample's surface 14. The deviation arrangement 52 comprises a first deviation beam splitter 56, configured substantially similar to the first beam splitter 24, to separate the measurement beam 26 from the reference beam 28.

In the preferred embodiment, the measurement beam 26 passes through the first deviation beam splitter 56 and contacts an adjustable deviation mirror 58. The angle of the adjustable deviation mirror 58 relative to the beam splitter 56 is adjustable for deviating the measurement beam 26 a selected amount from the reference beam 28, as a spot 26A of the measurement beam 26 and a spot 28A of the reference beam 28 each contact the surface 14 of the sample 12. In the preferred embodiment, the mirror 58 is adjustable for deviating the reference beam 28 from the measurement beam 26 an amount ranging from approximately 100 microns to 300 microns or more, with a most preferred amount of approximately 100 microns between the two beam spots 26A, 28A. The amount between the beam spots 26A, 28A when they contact the sample's surface 14 should be sufficient to enable the reference beam spot 28A to contact the surface 14, while the measurement beam spot 26A extends into craters 13 in the surface 14 as they are formed.

A beam splitter 60 recombines the beams 26, 28 and directs the beams 26, 28 into an analytical instrument 62, via a directing mirror 64. The analytical instrument 62, may comprise a vacuum chamber of a SIMS, XPS, ESCA, AES, or other suitable instrument, for performing analyses on the sample 12. The co-propagating beams 26, 28 are transmitted through a focusing lens 66 that is positioned adjacent to a window 68 in the instrument 62. The lens 66 is approximately coincident with a crossing point of the beams 26, 28. The focusing lens 66 converges the diameter of each of the beams 26, 28, so that the beams 26, 28 each have a substantially small spot size 26A, 28A, preferably approximately 10 microns in diameter, as they strike the sample's surface 14. As illustrated in FIG. 2, when the sample 12 undergoes analyses, the reference beam spot 28A extends along the reference surface 14 of the sample 12, while the measurement beam spot 26B extends into craters 13 in the sample's surface 14 for providing information as to the changes in depth of the crater 13. The invented depth monitor 10 is capable of determining changes in the depth of the craters 13 down to about 0.05 nm.

After the two beams 26, 28 strike the surface 14, the beams 26, 28 are reflected off of the sample 12 toward a second window 72 in the instrument 62. The still deviated beams 26, 28 diverge outwardly as they are reflected off the sample's surface 14, and continue to diverge as they pass through the window 72 and toward the detector module 16, via a collimating lens 74. The lens 74 is positioned adjacent to the second window 72 for collimating the diverging beams 26, 28, prior to the beams 26, 28 entering the module 16.

Referring again to FIG. 1, a first adjustable mirror 76 of a realignment assembly 78 receives the deviated and co-propagating beams 26, 28 from the lens 74 and reflects the beams 26, 28 into the assembly 78. The first adjustable mirror 76 is configured to provide ease of setup of the depth monitor 10, and particularly the realignment assembly 78, for optically realigning the monitor 10 due to use, if necessary.

The realignment assembly 78 further comprises a first beam splitter 80 that receives the reflected beams 26, 28 from the mirror 76 and again separates the co-propagating and orthogonally polarized beams 26, 28 into reflected measurement and reference beams 26, 28. The beam splitter 80 reflects the reference beam 28 toward a mirror 82 that directs the beam 28 into a recombining beam splitter 84. The measurement beam 26 passes through the beam splitter 80 and is transmitted to an adjustable alignment mirror 86. The alignment mirror 86 is slightly adjustable for realigning the two beams 26, 28 as they enter the recombining beam splitter 84 and are aligned as they are transmitted by the splitter 84 and co-propagate along an optical path 88 toward a polarization alignment means 90 for allowing the beams 26, 28 to optically interfere.

In the present invention 10, the polarization alignment means comprises a polarizer 90 oriented at approximately 45° to the polarization axis of the beams 26, 28 that allows the transmission of the common polarization components of each of the beams 26, 28 therethrough, while preventing the extraneous portions of the beams 26, 28 to pass through the polarizer 90, that incidentally reduces the signal intensity by approximately one half. A resulting signal 92 comprising the interference of the common polarization components of the measurement beam 26 and reference beam 28 are transmitted through an aperture 94 and into a photodetection means 96, such as a photodiode and its associated circuitry, which detects the interference signal 92 for determining measured crater depths.

In the preferred embodiment of the present invention 10, the photodetection means 96 is coupled to the reference signal generator or power source 32, and compares the phase of the resulting signal 92 to the phase of the reference signal driving the frequency shifting means 30, generated by the power source 32 for determining any difference therebetween. Any detected change in the phase difference directly indicates the development of a crater 13 in the sample's surface 14 and the depth thereof. The photodetection means 96 preferably comprises known electronic circuitry capable of performing the functions required thereof.

Vibrations of the sample 12, or portions of the invented depth monitor 10, or both, do not affect depth measurements due to common mode rejection inherent in the dual-beam design of the monitor 10, since the beams 26, 28 share a common optical path and any increase or decrease in total path length due to vibrations is common to both beams. Thus, changes in path length due to vibrations do not affect any length differentiation between the two beams, and thus depth measurements are not affected. The present invention 10 is capable of detecting very small changes, approximately 0.05 nm or more, in the path length difference between the two signals for providing substantially accurate depth measurements of the craters 13 formed in the sample's surface 14.

As the beams 26, 28 strike the sample's surface 14, the measurement beam spot 26A may extend into a crater 13, while the reference beam spot 28A continues to contact the sample's surface 14. A change in depth of the crater 13, such as caused by localized ion beam sputtering of the sample 12 at location 13, depending on the spot size 26A of the beam 26, shifts the phase of the reflected beam 26 correspondingly. By comparing the phase of the resulting signal 92 to the phase of the reference frequency driving the frequency shifting means 30, the depth of the measured crater 13 is extracted. Using this phase detection technique, the present invention 10 is able to detect substantially small changes, approximately 0.05 nm or more, in the path length difference between the beams 26, 28, for providing substantially accurate depth measurements of the craters 13 formed in the sample's surface 14.

Typically when undergoing analyses, the sample 12 to be analyzed is vibrating in the analytical instrument 62, necessitating that the optics of the invention 10 are designed to tolerate this effect. During analyses, sample mounts (not shown) and windows 68, 72 of the instrument 62 often undergo some uncontrolled thermal drift. The dual beam design of the invented depth monitor 10 allows for these problems by using unsputtered portions of the surface 14 as the reference point to allow for common mode rejection of the path length changes between the reference beam 28 and the measurement beam 26 generated by the present invention 10. The dual beam design of the invention 10 assures that fluctuations in the total path length of the interferometer that are common to both beams 26, 28, such as changes in total path length due to vibrations, do not affect depth measurement of craters 13 in the sample's surface 14.

The detected phase differences between the reflected co-propagating beams and reference frequency are continuously transmitted to a monitor means 98. The monitor means 98 may comprise a suitable, known monitoring device that is capable of providing a continuous readout for monitoring the sputter rate of an ion beam etch in real time, for correcting for any variations in the sputter rate of the beam as the etch craters 13 are formed in the sample's surface 14.

Alternatively, or in addition to the monitor device, the monitor means 98 may comprise a computer running commercially available data collecting software for determining the presence of any craters 13 in the sample's surface 14 and the depth thereof, for monitoring sputter rate of the sample undergoing analyses. The computer, which may comprise any suitable known computer, continuously processes the data received from the photodetection means 96 in a manner determined by the software, preferably while simultaneously providing a readout, for monitoring sputter rate of the sample 12 undergoing analyses to adjust the sputter rate as the analyses of the sample 12 are proceeding. The computer also allows integration of real time depth measurements into data collecting software, as analyses of the sample are proceeding, for correcting for any variations in sputter rate, including those caused by sputter beam intensity drift, for eliminating the assumption that the unknown material comprising the sample has the same sputter rate as a reference material.

Regardless of the configuration of the monitor means 98, the invented depth monitor 10 allows for correcting for any variations in sputter rate, including those caused by sputter beam intensity drift, for eliminating the assumption that the unknown material comprising the sample has the same sputter rate as a reference material.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A device for measuring changes in the relative height and depth of microscopic surface features of a sample, the device comprising:

means for generating a beam;

means for separating the beam into a first beam and a second beam;

means for identifying the first and second beams by imparting different polarizations on each of the beams;

means for recombining the first and second beam so that the beams co-propagate along a selected optical path;

means for directing the co-propagating beams toward the surface of the sample;

means for deviating one of the beams an amount from the other beam, the deviating means directing the first beam a sufficient amount from the second beam to enable the first beam to contact a surface of the sample at a discrete location, while the second beam contacts the surface of the sample at another discrete location, the beams contacting the surface of the sample as the sample is undergoing analyses;

means for realigning the polarization and optical path of the first and second beams reflected by the sample after contacting the surface thereof;

means for detecting time dependent intensity of the interfering and realigned beams; and means for comparing the detected signal to a reference signal to establish a path length difference between the beams, changes in the detected path length difference indicating the development of a deformation in the surface of the sample and the vertical extent thereof.

2. The device of claim 1 wherein the identifying means further identifies one of the first and second beams by frequency shifting the selected beam by the frequency of the reference signal.

3. The device of claim 2 wherein the comparing means compares the phase of the interfering co-propagating beams to the phase of the reference signal for detecting the difference therebetween, changes in the phase difference indicating the development of a deformation in the surface of the sample and the vertical extent thereof.

4. The device of claim 2 wherein the identifying means produces a modulation of the co-propagating beams using a method selected from the group consisting of Doppler shifting one of the beams, modulating optical path length of the beams, sinusoidal phase modulation, and optical heterodyning.

5. The device of claim 4 wherein an acousto-optic Bragg cell optically diffracts one of the beams for shifting the frequency thereof to produce the interface pattern between the beams.

6. The device of claim 1 further comprising a readout means receiving signals from the comparing means indicating the detected path length difference between the first and second beams, the readout means providing a continuous readout for controlling analyses of the sample depending upon the signal received from the comparing means.

7. The device of claim 6 further comprising:

computing means for receiving signals from the comparing means indicating the detected path length difference between the first and second beams, the computing means generating data for controlling analyses of the sample depending upon the signal received from the comparing means.

8. The device of claim 7 wherein the computing means generates data indicating crater depth based on the signals received from the comparing means for controlling sputter rate of the sample as analyses of the sample are proceeding.

9. A device for measuring changes in the relative height and depth of microscopic surface features of a sample that allows crater depth measurements to be made while depth profile analyses of the sample are proceeding, the device comprising:

a source module including a plurality of optical elements for directing a beam along a desired optical path, the source module comprising, means for generating a beam, means for splitting the beam into a measurement beam and a reference beam, the splitting means identifying the two beams by imparting different polarizations on each of the beams, means for shifting the frequency of the reference beam by a reference frequency, means for recombining the two beams so that the beams co-propagate along an optical path, and a deviating arrangement for deviating one of the beams relative to the other beam, such that a selected one of the reference beam and measurement beam is deviated an angle from the remaining beam as a spot of each of the beams contacts the surface of the sample, the deviating arrangement directing the selected beam a sufficient amount from the remaining beam to enable the selected beam to contact the surface of the sample at a discrete location, while the remaining beam contacts the surface of the sample at another discrete location for measuring changes in the relative height and depth of the locations, the reference and measurement beams contacting the surface of the sample as the sample is undergoing analyses, the surface reflecting the two beams; and a detector module for receiving the reflected reference and measurement beams, the detector module including a plurality of optical elements for directing the beams along a desired optical path, the detector module comprising, means for receiving the reflected reference and measurement beams, means for realigning the polarization and recombining the reflected beams so that the beams interfere, and means for detecting time dependent intensity of the interfering and realigned beams;

means for comparing the detected signal to a reference signal to establish a path length difference between the beams, changes in the detected path length difference indicating the development of a deformation in the surface of the sample and the vertical extent thereof; and monitoring means for providing a continuous readout for monitoring the sputter rate of an ion beam etch in real time for correcting for any variations in the sputter rate of the beam as etch craters are formed in the surface of the sample.

10. The device of claim 9 wherein the frequency shifting means shifts the frequency of the reference beam using an acousto-optic Bragg cell.

11. The device of claim 9 wherein the monitor means further comprises:

computing means for receiving signals from the detecting means indicating the detected path length difference between the reference beam and measurement beam, the computing means generating data for controlling sputter rate of the sample, depending upon signals received from the detecting means, as analyses of the sample are proceeding.

12. The device of claim 9 wherein the measurement beam and reference beam have the same optical path so that changes in optical path length common to both beams, due to vibrations of the sample undergoing analyses, vibrations of the device, thermal expansion, and vibrations of the sample and device, and combinations thereof do not effect accuracy of crater depth measurements.

13. The device of claim 12 wherein the device is capable of measuring changes in crater depth in increments of less than 1.0 nanometer.

14. The device of claim 13 wherein the device is capable of measuring changes in crater depth in increments of approximately 0.05 nanometer.

15. The device of claim 8 wherein the deviating arrangement includes:

an adjustable mirror that deviates a selected one of the reference beam and measurement beam an angle from the remaining beam, the mirror directing the selected beam a sufficient amount from the remaining beam to enable the spot of the deviated beam to contact the surface of the sample at a discrete location, while the spot of the remaining beam contacts the surface of the sample at another discrete location.

16. The device of claim 9 further comprising:

focusing means focusing the each of the measurement and reference beams for forming the spots thereof so that the spot of each beam contacts the surface of the sample at a separate and discrete location with a desired amount therebetween, the focusing means substantially reducing the diameter of each of the beams to enable the reference beam to contact the surface of the sample while the diameter of the measurement beam is sufficiently small to allow the beam to extend into craters formed in the surface of the sample, as the sample is undergoing analyses.

17. The device of claim 16 wherein the focusing means reduces the diameter of each of the beams so that the spots of the beams have a diameter of less than 25 microns.

18. The device of claim 15 wherein the amount induced by the deviating arrangement between the spots of the two beams as the beams contact the surface of the sample ranges from approximately 25 microns to approximately 300 microns.

19. The device of claim 16 wherein the amount induced by the deviating arrangement between the spots of the two beams as the beams contact the surface of the sample ranges from approximately 50 microns to approximately 200 microns.

20. A device for measuring changes in the relative height and depth of microscopic surface features of a sample that allows crater depth measurements to be made while depth profile analyses of the sample are proceeding, the device comprising:

a source module including a plurality of optical elements for directing a beam along a desired optical path, the source module comprising, means for generating a beam, means for splitting the beam into a measurement beam and a reference beam, the splitting means identifying the two beams by imparting different polarizations on each of the beams, means for shifting the frequency of the reference beam by a reference frequency, means for recombining the two beams so that the beams co-propagate along an optical path, means for expanding the beams to minimize the effects of optical diffraction, and a deviating arrangement for deviating one of the beams relative to the other beam, such that a selected one of the reference beam and measurement beam is deviated an angle from the remaining beam as a spot of each of the beams contacts the surface of the sample, a spot of each of the reference and measurement beams contacting the surface of the sample as the sample is undergoing analyses with the surface reflecting the two beams, the deviating arrangement including, a first beam splitting means for splitting the co-propagating beams into the reference beam and measurement beam;

an adjustable mirror positioned adjacent to the beam separating means for deviating a selected one of the reference beam and measurement beam an angle from the remaining beam when the spots of the beams contact the sample, the mirror directing the deviated beam a sufficient amount from the remaining beam to enable the deviated beam to contact the surface of the sample at a discrete location, while the remaining beam contacts the surface of the sample at another discrete location, and a first beam recombining means for recombining the beams so that the beams are co-propagating;

an analytical instrument housing the sample, the instrument including means for enabling the beams to pass therethrough;

a focusing lens for directing the co-propagating beams through a first signal passing means of the analytical instrument and toward the sample undergoing analyses housed therein, the focusing lens substantially reducing the diameter of the each of the beams of obtaining the spots thereof so that the spot of the measurement beam and the spot of the reference beam each contacting the surface of the sample at a separate and discrete location with a desired distance therebetween, the spot of the reference beam contacting the surface of the sample while the spot of the measurement beam is sufficiently small to allow the beam to extend into craters formed in the surface of the sample, as the sample is undergoing analyses, the surface reflecting the two beams during analyses;

a collimating lens positioned adjacent to a second signal passing means of the analytical instrument for receiving the reflected measurement beam and reference beams;

a detector module for receiving the reflected measurement and reference beams, the detector module including a plurality of optical elements for directing the beams along a desired optical path, the detector module comprising, a beam splitter for splitting the reflected beams, the beam splitter directing the deviated beam toward an adjustable realigning mirror and directing the remaining beam toward a beam recombining means, the adjustable realigning mirror directing the deviated beam toward the recombining means and adjusting the optical path thereof toward the recombining means to align the deviated beam with the remaining beam, the recombining means recombining the aligned beams so that the two beams interfere as they co-propagate along the optical path, means for rejecting components of the beams that do not have the same polarization axis, and means for detecting time dependent intensity of the interfering beams to establish a path length difference between the beams and a reference frequency for detecting a path length difference therebetween, the detected path length difference indicating the presence of a crater in the surface of the sample and the depth thereof, the detecting means detecting the path length difference between the interfering beams and a reference frequency so that changes in optical path length common to both beams due to vibrations of the sample undergoing analyses, vibrations of the device, thermal expansion, and vibrations of the sample and device, and combinations thereof do not effect accuracy of crater depth measurements; and monitoring means for providing a continuous readout for monitoring the sputter rate of an ion beam etch in real time for correcting for any variations in the sputter rate of the beam as etch craters are formed in the surface of the sample.

21. The device of claim 20 wherein the device is capable of measuring changes in crater depth in increments of less than 1.0 nanometer.

22. The device of claim 21 wherein the device is capable of measuring changes in crater depth in increments of approximately 0.05 nanometer.

23. The device of claim 19 wherein the distance between the two beams induced by the deviating arrangement ranges from approximately 25 microns to approximately 300 microns.

24. The device of claim 23 wherein the distance between the two beams induced by the deviating arrangement ranges from approximately 50 microns to approximately 200 microns.

25. The device of claim 20 wherein the focusing lens reduces the diameter of each of the beams as the beams contact the surface of the sample to a diameter of less than 25 microns.

26. The device of claim 25 wherein the focusing lens reduces the diameter of each of the beams as the beams contact the surface of the sample to a diameter of approximately 10 microns.

* * * * *